United States Patent [19]

Deutsch

[11] 4,267,761

[45] May 19, 1981

[54] MUSICAL TONE GENERATOR UTILIZING DIGITAL SLIDING FORMANT FILTER

[75] Inventor: Ralph Deutsch, Sherman Oaks, Calif.

[73] Assignee: Kawai Musical Instrument Mfg. Co. Ltd., Hamamatsu, Japan

[21] Appl. No.: 839,916

[22] Filed: Oct. 6, 1977

[51] Int. Cl.[3] ........................ G10H 1/00; G10H 1/02; G06F 7/38

[52] U.S. Cl. ........................................ 84/1.01; 84/1.19; 364/724

[58] Field of Search ........................ 84/1.01, 1.11, 1.19, 84/1.21; 364/718, 724

[56] References Cited

U.S. PATENT DOCUMENTS

| | | | |
|---|---|---|---|
| 3,515,792 | 6/1970 | Deutsch | 84/1.26 |
| 3,878,749 | 4/1975 | Woron | 84/1.19 |
| 3,939,750 | 2/1976 | Inoue et al. | 84/1.19 |
| 4,101,964 | 7/1978 | Betts | 364/723 |
| 4,114,498 | 9/1978 | Chieana et al. | 84/1.11 |
| 4,122,742 | 10/1978 | Deutsch | 84/1.11 |
| 4,149,258 | 4/1979 | Yahata et al. | 364/724 |

OTHER PUBLICATIONS

Rabiner & Gold, Theory and Application of Digital Signal Processing, 1975, pp. 3, 9–10, 553–557, 663.

Hal Chamberlin, "A Sampling of Techniques for Computer Performance of Music," BYTE, Sep. 1977, pp. 66–83.

*Primary Examiner*—Stanley J. Witkowski
*Assistant Examiner*—Forester W. Isen
*Attorney, Agent, or Firm*—Christie, Parker & Hale

[57] ABSTRACT

In a digital tone synthesizer of a type using digital data representing the amplitudes of a predetermined fixed number of sample points along one cycle of the audio waveform of a musical tone and an oscillator controlling the sampling frequency as well as the pitch of the tone, a digital filter for transferring the digital data to a digital-to-analog converter at the sampling rate. The digital filter, in response to applied input coefficient values, operates as a low pass or high pass filter in which the cut-off frequency is a predetermined harmonic of the pitch frequency of the tone. By changing the coefficient values, the cut-off harmonic can be changed for a tone independently of the pitch of the tone. Thus any tone of the musical scale may be filtered to modify the harmonic content independently of the pitch of the tone.

16 Claims, 11 Drawing Figures

MUSICAL TONE GENERATOR UTILIZING DIGITAL SLIDING FORMANT FILTER

FIELD OF THE INVENTION

This invention relates to digital tone generators, and more specifically, to digital sliding formant filters for digital tone synthesizers.

BACKGROUND OF THE INVENTION

The formant filters of conventional tone synthesizers may be either of the fixed or sliding type of formant filter. The fixed formant filter has a fixed characteristic with respect to the fundamental frequency of the note being synthesized. Thus the critical frequency (the cut-off frequency for either a low pass or high pass filter) is scaled with respect to the fundamental frequency so as to modify the harmonic content of the tone. In the sliding formant filter the critical frequency which is scaled with respect to the fundamental frequency, is caused to vary with time in response to some input control. The input control may be from the ADSR generator so that the harmonic content of the tone changes from the initial attack through the decay, sustain, and release of the tone. Conventional analog-type tone synthesizers utilize a plurality of filters in the form of resistance-reactance networks to control the frequency characteristics of each tone individually. Where the tones are generated digitally and then converted to analog audio signals, it has been the practice to provide formant filtering action by individually modifying the harmonic coefficients used in synthesizing a waveshape data set using a Fourier transform calculation. Formant filtering in systems of this type are described, for example, in U.S. Pat. No. 3,956,960 and U.S. Pat. No. 4,000,675. In copending application Ser. No. 603,776, filed Aug. 11, 1975, entitled "Polyphonic Tone Synthesizer", now issued as U.S. Pat. No. 4,085,644 there is also described a sliding formant filter which modifies the harmonic coefficients used in synthesizing a set of digitized data representing the amplitudes of sampling points along one cycle of the audio waveform being synthesized. Such known digital systems with formant filtering depend on the individual harmonic coefficients being available in order to control the harmonic content of the synthesized tone.

SUMMARY OF THE INVENTION

The present invention is directed to an improved arrangement for providing sliding formant filters in a digital musical tone generator in which the individual harmonic coefficients need not be available. Such a digital tone synthesizer is described, for example, in U.S. Patent 3,515,792 in which only the digitized values of the sample points on the composite waveform are available. The present invention utilizes the known characteristics of digital type filters to modify the data representing the amplitudes of the sample points defining the waveform of the tone to be generated. The digital filter can be designed so that the filter response is invariant and is scaled linearly with the sampling frequency. Thus the digital filter provides the same relative response when used with tones of different fundamental frequencies. The present invention provides a digital filter which operates both as a sliding low pass and a sliding high pass filter with the cut-off characteristic being determined in both cases by the same set of digital coefficient values. The coefficient values which can be stored in a Read Only memory or calculated, can be varied to change the cut-off characteristic of the digital filter. The filter cut-off changes in increments of harmonic numbers.

This is accomplished, in brief, by providing in a digital tone synthesizer a source of digital data corresponding to the amplitudes of a series of points defining the waveform of a tone to be generated. The data is read out at a sampling rate which is determined by the pitch of the tone being generated. The data is coupled to a digital-to-analog converter through a digital filter circuit at the same rate at which the data is transferred from the source. The digital filter means includes means for controlling the characteristic of the digital filter as a function of time by generating a plurality of coefficient values which control the transfer characteristic of the digital filter.

DESCRIPTION OF THE DRAWINGS

For a more complete understanding of the invention reference should be made to the accompanying drawings, wherein.

DETAILED DESCRIPTION

Figure 1:
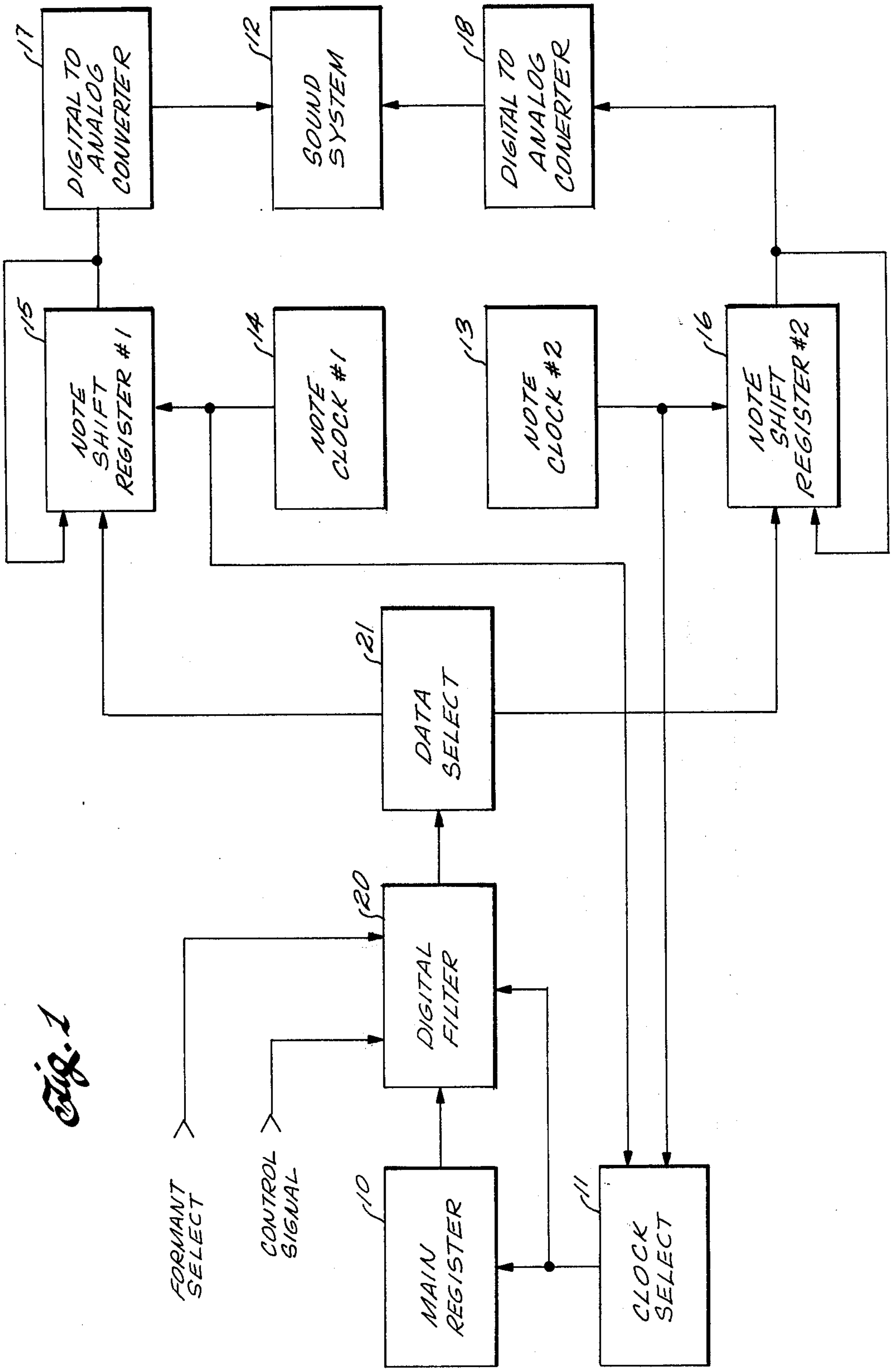
FIG. 1 is a schematic block diagram of a digital tone generator with sliding formant filter.

Referring to FIG. 1 in detail, there is shown a tone generator of the type described, for example, in copending application Ser. No. 603,776, filed Aug. 11, 1975, entitled "Polyphonic Tone Synthesizer" now issued as U.S. Pat. No. 4,085,644. However, the invention is not limited to tone generators of the type shown in this application but may be employed, for example, in connection with a tone generator of the type described in U.S. Pat. No. 3,515,792. In the arrangement shown in FIG. 1, a main register stores a master data list in which each word in the list represents the amplitude of a sample point of the waveform being generated. For example, the main register may store 64 words representative of 64 equally spaced data points along one cycle of the waveform being generated. The master data list may be loaded in the main register 10 from a waveform memory in response to the operation of a key on the keyboard instrument, or may be loaded in the main register 10 by calculating the data in the manner described in the above-identified copending application. The master data list is then transferred to any one of a number of tone generators, two of which are shown in FIG. 1, through a data select circuit 21. The data select circuit directs the master data list to a note shift register in one of the tone generators, such as the note shift register #1, indicated at 15, or the note shift register #2, indicated at 16. The master data list is shifted from the main register to the note shift register by clock pulses from the associated note clock, such as the note clock #1, indicated at 14, or the note clock #2, indicated at 13, through the clock select circuit 11. The frequency of the note clock is determined by the pitch of the key which is depressed on the keyboard. The note clock is set to have a pulse repetition frequency that is 64 times the fundamental pitch frequency of the note being generated in response to a particular key on the keyboard.

Once the master data list is transferred to the note shift register from the main register, the main register 10 is free to receive a master data list associated with another note. With the master data list in the note shift register 15, the 64 digitized sample points on the waveform are shifted out of the note shift register serially one word at a time from the note shift register to a digital-to-analog converter, such as indicated at 17 and 18, which converts each digitized word to an analog voltage. Thus the output of the converter is a voltage which changes in amplitude with time at a rate controlled by the note clock and steps controlled by the data in the master data list. This analog voltage is applied to a sound system 12 which converts the analog voltage to an audible tone.

In prior art digital tone generators of the type just described, filtering was done by modifying the data in the master data list. The master data list was calculated by utilizing a set of coefficients representing the relative amplitudes of the harmonics used to synthesize the waveshape using a Fourier transform calculation. The present invention provides a formant filter which may be either a high pass or low pass, and may be either fixed or sliding by utilizing a digital filter, as indicated at 20 in FIG. 1, inserted in the transfer path from the main register 10 to the respective note shift registers of the tone generators. A formant select signal on the input to the digital filter 20 determines whether the digital filter acts as a low pass or high pass filter. A variable digital control signal on the input to the filter 20 controls the cut-off characteristic of the digital filter. Digital filters as such are well known to the art. See, for example, the book "Digital Processing of Signals", by Berhand Gold and Charles Rader, McGraw Hill Publishing, 1969. A particular form of digital filter which has advantages for the present application is of a variety known generically by the name "Elliptic Digital Filters". The transfer function in the Z-domain for a second order elliptical filter is expressed by the relation:

$$H(Z) = \frac{1 + A_1Z^{-1} + A_2Z^{-2}}{1 + B_1Z^{-1} + B_2Z^{-2}}$$

The terms $Z^{-1}$ denote a delay of one clock pulse while those with $Z^{-2}$ denote a delay of two clock pulses. Four coefficients $A_1$, $A_2$, $B_1$, and $B_2$ control the characteristics of the filter.

Figure 4:
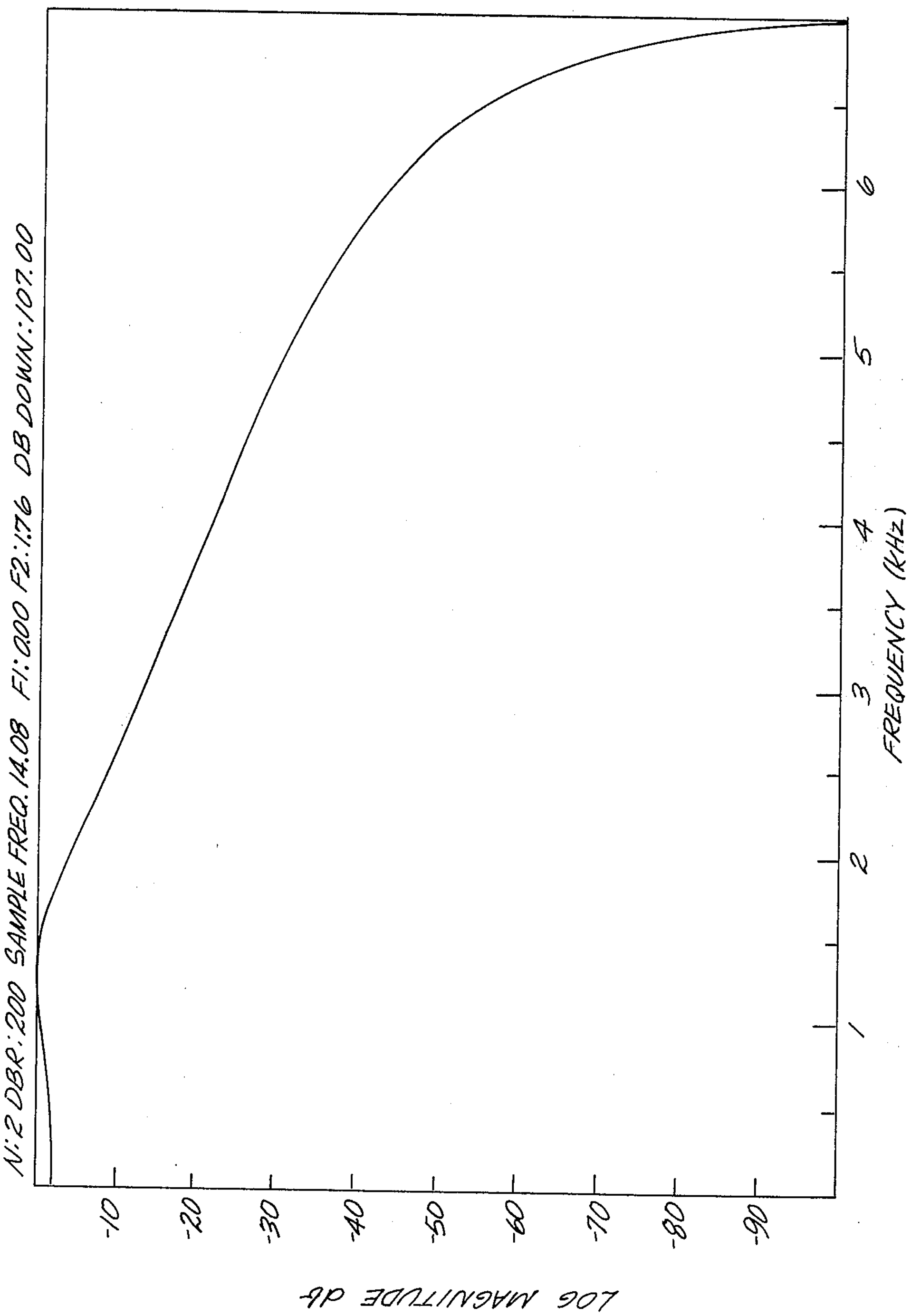
FIGS. 4–7 are frequency response curves for low pass and high pass filters of the type shown in FIG. 2.
Figure 5:
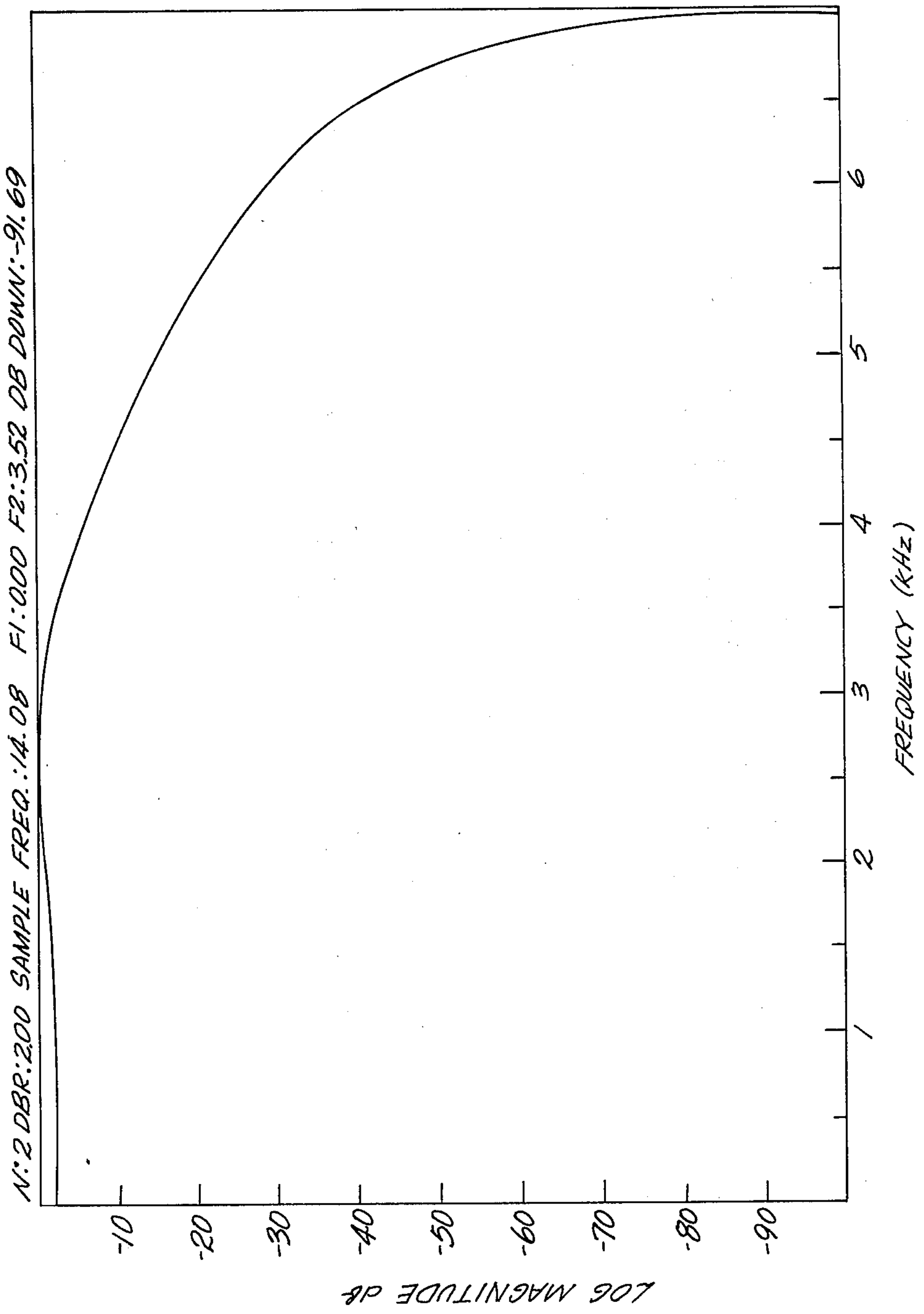
Figure 6:
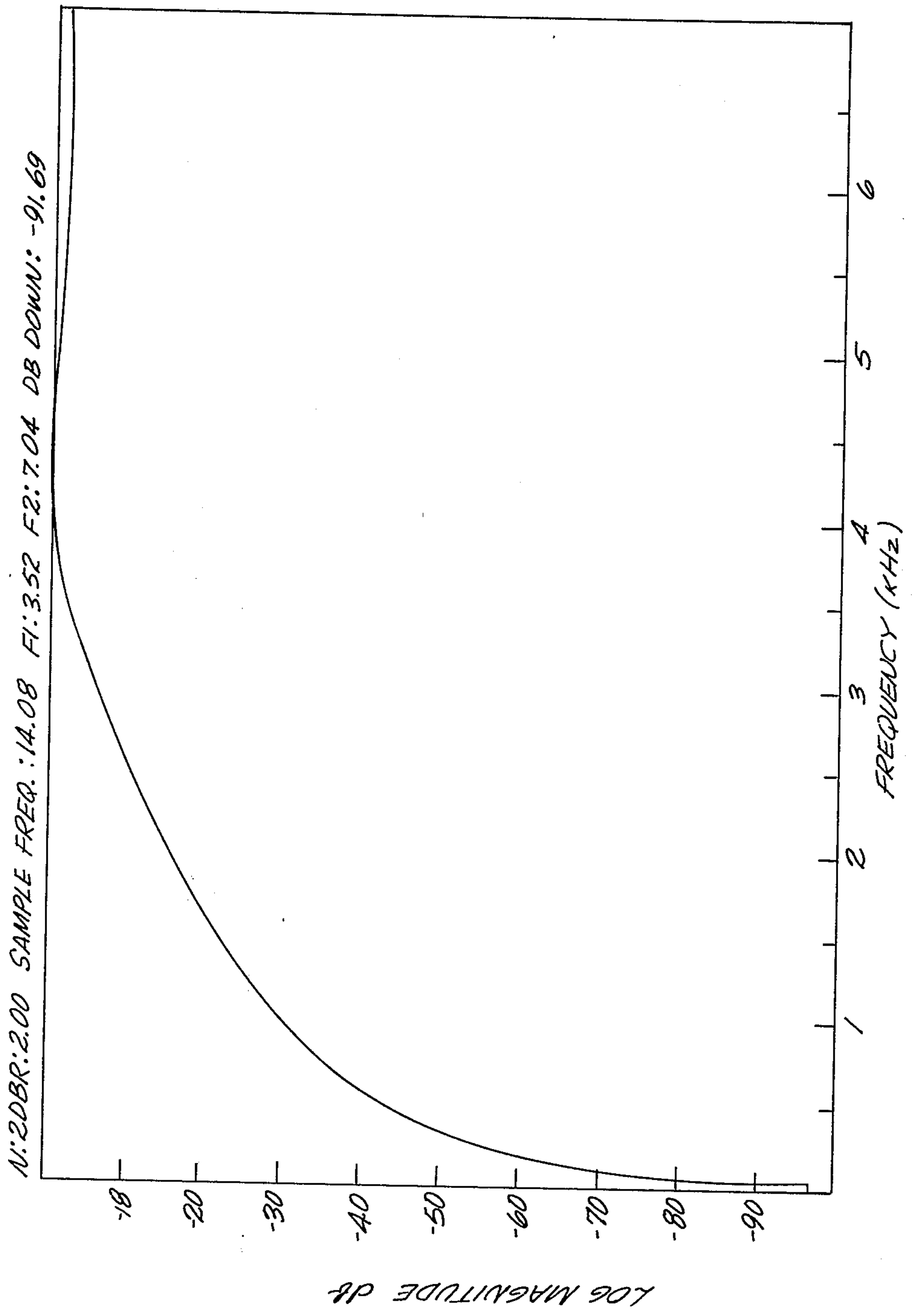
Figure 7:
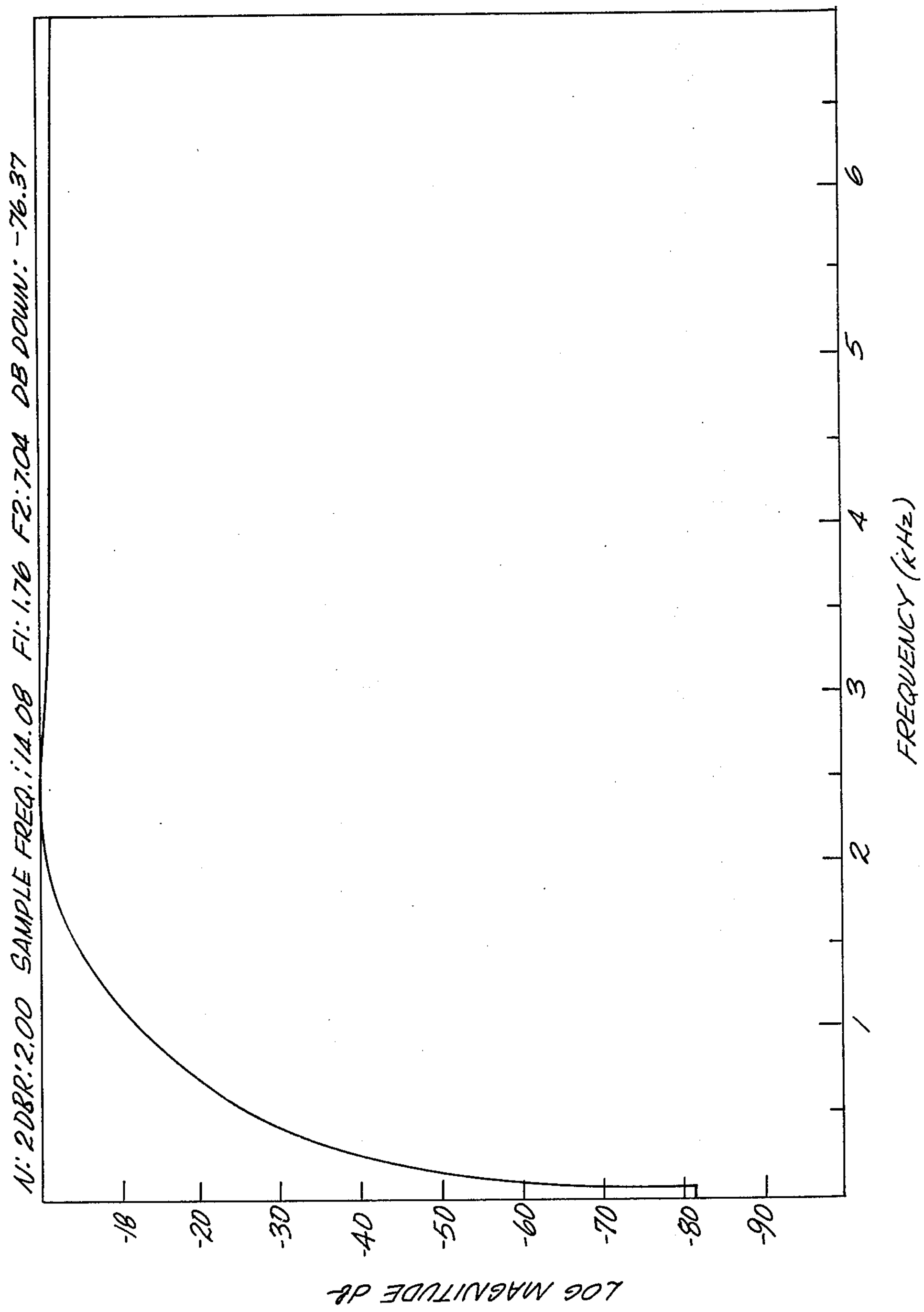

The present invention provides an improved digital filter specifically designed for use in a digital tone generator in the manner described above in connection with FIG. 1. The digital filter is shown in block form in FIG. 2. The digital filter of the present invention provides both a sliding low pass and a sliding high pass filter using the same set of coefficients $A_1$, $A_2$, $B_1$ and $B_2$. Before considering the filter design in detail, reference should be made to FIGS. 4, 5, 6 and 7 which illustrate the frequency response of an elliptic digital filter of the above noted equation configured as a low pass filter and as a high pass filter. The allowable ripple in the pass band was selected as 2 db., since the ear can only detect changes of about 3 db. For illustration, the frequency response curves of the figures are drawn for a fundamental pitch frequency $A_3$ =220 hz with a sampling frequency of 14.08 khz. This sampling frequency accommodates a tone generating system having a 32 harmonic capability. FIG. 4 shows a frequency response for a digital filter having a cuttoff frequency selected at 1.76 khz, which corresponds to the 8th harmonic of the fundamental pitch frequency $A_3$. FIG. 5 illustrates the same digital filter configuration but with a cut-off frequency at 3.52 khz, corresponding to the 16th harmonic of $A_3$. FIGS. 6 and 7 illustrate similar curves for a high pass filter to pass frequencies about the cutoff frequency, corresponding to the 8th harmonic and the 16th harmonic, respectively.

The following Table 1 lists the coefficients $A_1$, $A_2$, $B_1$, and $B_2$ which can be used in equation 1 for providing a digital filter having a low pass configuration. Each set of four coefficients corresponds to a different cut-off frequency of the resulting tone. The table is arranged so that the cut-off frequencies correspond to the harmonics of the note $A_3$. These coefficients are derived in the manner described in the article "A Computer Program for Designing Elliptic Filters" by Augustus H. Gray, Jr., and John D. Markel, IEEE Trans. ASSP Vol. ASSP-24 No. 6, December 1976, pages 529–538.

TABLE 1

| FREQ. | $B_1$ | $B_2$ | $A_1$ | $A_2$ | GAIN |
|---|---|---|---|---|---|
| 0.220 | −1.91654E + 000 | 9.24167E − 001 | 1.99984E + 000 | 1.00000E + 000 | 1.51509E − 003 |
| 0.440 | −1.82498E + 000 | 8.54355E − 001 | 1.99984E + 000 | 1.00000E + 000 | 5.83385E − 003 |
| 0.660 | −1.72663E + 000 | 7.90328E − 001 | 1.99984E + 000 | 1.00000E + 000 | 1.26488E − 002 |
| 0.880 | −1.62259E + 000 | 7.31832E − 001 | 1.99984E + 000 | 1.00000E + 000 | 2.16936E − 002 |
| 1.100 | −1.51376E + 000 | 6.78616E − 001 | 1.99984E + 000 | 1.00000E + 000 | 3.27396E − 002 |
| 1.320 | −1.40085E + 000 | 6.30434E − 001 | 1.99984E + 000 | 1.00000E + 000 | 4.55927E − 002 |
| 1.540 | −1.28448E + 000 | 5.87059E − 001 | 1.99984E + 000 | 1.00000E + 000 | 6.00896E − 002 |
| 1.760 | −1.16511E + 000 | 5.48286E − 001 | 1.99984E + 000 | 1.00000E + 000 | 7.60944E − 002 |
| 1.980 | −1.04314E + 000 | 5.13933E − 001 | 1.99984E + 000 | 1.00000E + 000 | 9.34955E − 002 |
| 2.200 | −9.18848E − 001 | 4.83845E − 001 | 1.99984E + 000 | 1.00000E + 000 | 1.12203E − 001 |
| 2.420 | −7.92485E − 001 | 4.57898E − 001 | 1.99984E + 000 | 1.00000E + 000 | 1.32144E − 001 |
| 2.640 | −6.64229E − 001 | 4.35996E − 001 | 1.99984E + 000 | 1.00000E + 000 | 1.53265E − 001 |
| 2.860 | −5.34220E − 001 | 4.18074E − 001 | 1.99984E + 000 | 1.00000E + 000 | 1.75525E − 001 |
| 3.080 | −4.02571E − 001 | 4.04099E − 001 | 1.99984E + 000 | 1.00000E + 000 | 1.98893E − 001 |
| 3.300 | −2.69372E − 001 | 3.94069E − 001 | 1.99984E + 000 | 1.00000E + 000 | 2.23354E − 001 |
| 3.520 | −1.34702E − 001 | 3.88017E − 001 | 1.99984E + 000 | 1.00000E + 000 | 2.48896E − 001 |
| 3.740 | 1.36127E − 003 | 3.86008E − 001 | 1.99984E + 000 | 1.00000E + 000 | 2.75518E − 001 |
| 3.960 | 1.38732E − 001 | 3.88144E − 001 | 1.99984E + 000 | 1.00000E + 000 | 3.03222E − 001 |
| 4.180 | 2.77306E − 001 | 3.94564E − 001 | 1.99984E + 000 | 1.00000E + 000 | 3.32017E − 001 |
| 4.400 | 4.16946E − 001 | 4.05443E − 001 | 1.99984E + 000 | 1.00000E + 000 | 3.61908E − 001 |
| 4.620 | 5.57474E − 001 | 4.20997E − 001 | 1.99984E + 000 | 1.00000E + 000 | 3.92904E − 001 |

TABLE 1-continued

| FREQ. | $B_1$ | $B_2$ | $A_1$ | $A_2$ | GAIN |
|---|---|---|---|---|---|
| 4.840 | 6.98648E − 001 | 4.41482E − 001 | 1.99984E + 000 | 1.00000E + 000 | 4.25008E − 001 |
| 5.060 | 8.40150E − 001 | 4.67197E − 001 | 1.99984E + 000 | 1.00000E + 000 | 4.58216E − 001 |
| 5.280 | 9.81560E − 001 | 4.98482E − 001 | 1.99984E + 000 | 1.00000E + 000 | 4.92511E − 001 |
| 5.500 | 1.12233E + 000 | 5.35718E − 001 | 1.99984E + 000 | 1.00000E + 000 | 5.27862E − 001 |
| 5.720 | 1.26176E + 000 | 5.79325E − 001 | 1.99984E + 000 | 1.00000E + 000 | 5.64210E − 001 |
| 5.940 | 1.39895E + 000 | 6.29758E − 001 | 1.99984E + 000 | 1.00000E + 000 | 6.01470E − 001 |
| 6.160 | 1.53277E + 000 | 6.8700E − 001 | 1.99984E + 000 | 1.00000E + 000 | 6.39514E − 001 |
| 6.380 | 1.66184E + 000 | 7.53054E − 001 | 1.99984E + 000 | 1.00000E + 000 | 6.78165E − 001 |
| 6.600 | 1.78448E + 000 | 8.26962E − 001 | 1.99984E + 000 | 1.00000E + 000 | 7.17197E − 001 |
| 6.820 | 1.89894E + 000 | 9.10016E − 001 | 1.99984E + 000 | 1.00000E + 000 | 7.56421E − 001 |

N:2, DBR:2.00 SAMPLE FREQ.:14.08,F1: 0.00,F2: 6.82,DB DOWN: −39.20

Table 2 below lists the coefficients for a high pass configuration in which again the coefficients define the cut-off frequency corresponding to the harmonics of the note $A_3$. The coefficients are expressed in floating decimal point notation with the exponent values in the right-hand three digits of each column.

TABLE 2

| FREQ. | $B_1$ | $B_2$ | $A_1$ | $A_2$ | GAIN |
|---|---|---|---|---|---|
| 0.220 | −1.89894E + 000 | 9.10016E − 001 | −1.99984E + 000 | 1.00000E + 000 | 7.56421E − 001 |
| 0.440 | −1.78448E + 000 | 8.26962E − 001 | −1.99984E + 000 | 1.00000E + 000 | 7.17194E − 001 |
| 0.660 | −1.66184E + 000 | 7.53054E − 001 | −1.99984E + 000 | 1.00000E + 000 | 6.78165E − 001 |
| 0.880 | −1.53277E + 000 | 6.87500E − 001 | −1.99984E + 000 | 1.00000E + 000 | 6.39514E − 001 |
| 1.100 | −1.39895E + 000 | 6.29758E − 001 | −1.99984E + 000 | 1.00000E + 000 | 6.01470E − 001 |
| 1.320 | −1.26176E + 000 | 5.79325E − 001 | −1.99984E + 000 | 1.00000E + 000 | 5.64210E − 001 |
| 1.540 | −1.12233E + 000 | 5.35718E − 001 | −1.99984E + 000 | 1.00000E + 000 | 5.27862E − 001 |
| 1.760 | −9.81560E − 001 | 4.98482E − 001 | −1.99984E + 000 | 1.00000E + 000 | 4.92511E − 001 |
| 1.980 | −8.40150E − 001 | 4.67197E − 001 | −1.99984E + 000 | 1.00000E + 000 | 4.58216E − 001 |
| 2.200 | −6.98648E − 001 | 4.41482E − 001 | −1.99984E + 000 | 1.00000E + 000 | 4.25008E − 001 |
| 2.420 | −5.57474E − 001 | 4.20997E − 001 | −1.99984E + 000 | 1.00000E + 000 | 3.92904E − 001 |
| 2.640 | −4.16946E − 001 | 4.05443E − 001 | −1.99984E + 000 | 1.00000E + 000 | 3.61908E − 001 |
| 2.860 | −2.77306E − 001 | 3.94564E − 001 | −1.99984E + 000 | 1.00000E + 000 | 3.32017E − 001 |
| 3.080 | −1.38732E − 001 | 3.88144E − 001 | −1.99984E + 000 | 1.00000E + 000 | 3.03222E − 001 |
| 3.300 | −1.36127E − 003 | 3.86008E − 001 | −1.99984E + 000 | 1.00000E + 000 | 2.75518E − 001 |
| 3.520 | 1.34702E − 001 | 3.88017E − 001 | −1.99984E + 000 | 1.00000E + 000 | 2.48896E − 001 |
| 3.740 | 2.69372E − 001 | 3.94069E − 001 | −1.99984E + 000 | 1.00000E + 000 | 2.23354E − 001 |
| 3.960 | 4.02571E − 001 | 4.04099E − 001 | −1.99984E + 000 | 1.00000E + 000 | 1.98893E − 001 |
| 4.180 | 5.34220E − 001 | 4.18074E − 001 | −1.99984E + 000 | 1.00000E + 000 | 1.75525E − 001 |
| 4.400 | 6.64229E − 001 | 4.35996E − 001 | −1.99984E + 000 | 1.00000E + 000 | 1.53265E − 001 |
| 4.620 | 7.92485E − 001 | 4.57898E − 001 | −1.99984E + 000 | 1.00000E + 000 | 1.32144E − 001 |
| 4.840 | 9.18848E − 001 | 4.83845E − 001 | −1.99984E + 000 | 1.00000E + 000 | 1.12203E − 001 |
| 5.060 | 1.04314E + 000 | 5.13933E −:0 001 | −1.99984E + 000 | 1.00000E + 000 | 9.34955E − 002 |
| 5.280 | 1.16511E + 000 | 5.48286E − 001 | −1.99984E + 000 | 1.0000E + 000 | 7.60944E − 002 |
| 5.500 | 1.28448E + 000 | 5.87059E − 001 | −1.99984E + 000 | 1.00000E + 000 | 6.00896E − 002 |
| 5.720 | 1.40085E + 000 | 6.30434E − 001 | −1.99984E + 000 | 1.00000E + 000 | 4.55927E − 002 |
| 5.940 | 1.51376E + 000 | 6.78616E − 001 | −1.99984E + 000 | 1.00000E + 000 | 3.27396E − 002 |
| 6.160 | 1.62259E + 000 | 7.31832E − 001 | −1.99984E + 000 | 1.00000E + 000 | 2.16936E − 002 |
| 6.380 | 1.72663E + 000 | 7.90328E − 001 | −1.99984E + 000 | 1.00000E + 000 | 1.26488E − 002 |
| 6.600 | 1.82498E + 000 | 8.54355E − 001 | −1.99984E + 000 | 1.00000E + 000 | 5.83385E − 003 |
| 6.820 | 1.91654E + 000 | 9.24167E − 001 | −1.99984E + 000 | 1.00000E + 000 | 1.51509E − 003 |

N: 2,DBR:2.00,SAMPLE FREQ.:14.08,F1: 6.82,F2: 7.04,DB DOWN: −144.83

It will be noted from Tables 1 and 2 that the coefficient $A_1$ has the approximate value of 2 for each cut-off and the coefficient $A_2$ is equal to unity for a low pass filter configuration, while the coefficient $A_1$ has a value of −2 with $A_2$ equal to unity for the high pass configuration. Furthermore it will be noted that the coefficient values $B_1$ and $B_2$ are identical but in the reverse order, enabling the same set of coefficients $B_1$ and $B_2$ to be used for both the high pass and low pass filter configurations. These coefficients can be stored, for example, in a Read Only memory which is addressed in response to the control signal input to the digital filter, permitting the filter cut-off frequency to change in increments of harmonic numbers. It should be noted that while Tables 1 and 2 list the frequencies as harmonics of $A_3$, the normalizing action of the pitch frequency being a function of the sampling frequency permits the numbers in these tables to be interpreted as corresponding to the harmonics of any fundamental pitch frequency which is 1/64 of the sampling frequency.

Figure 2:
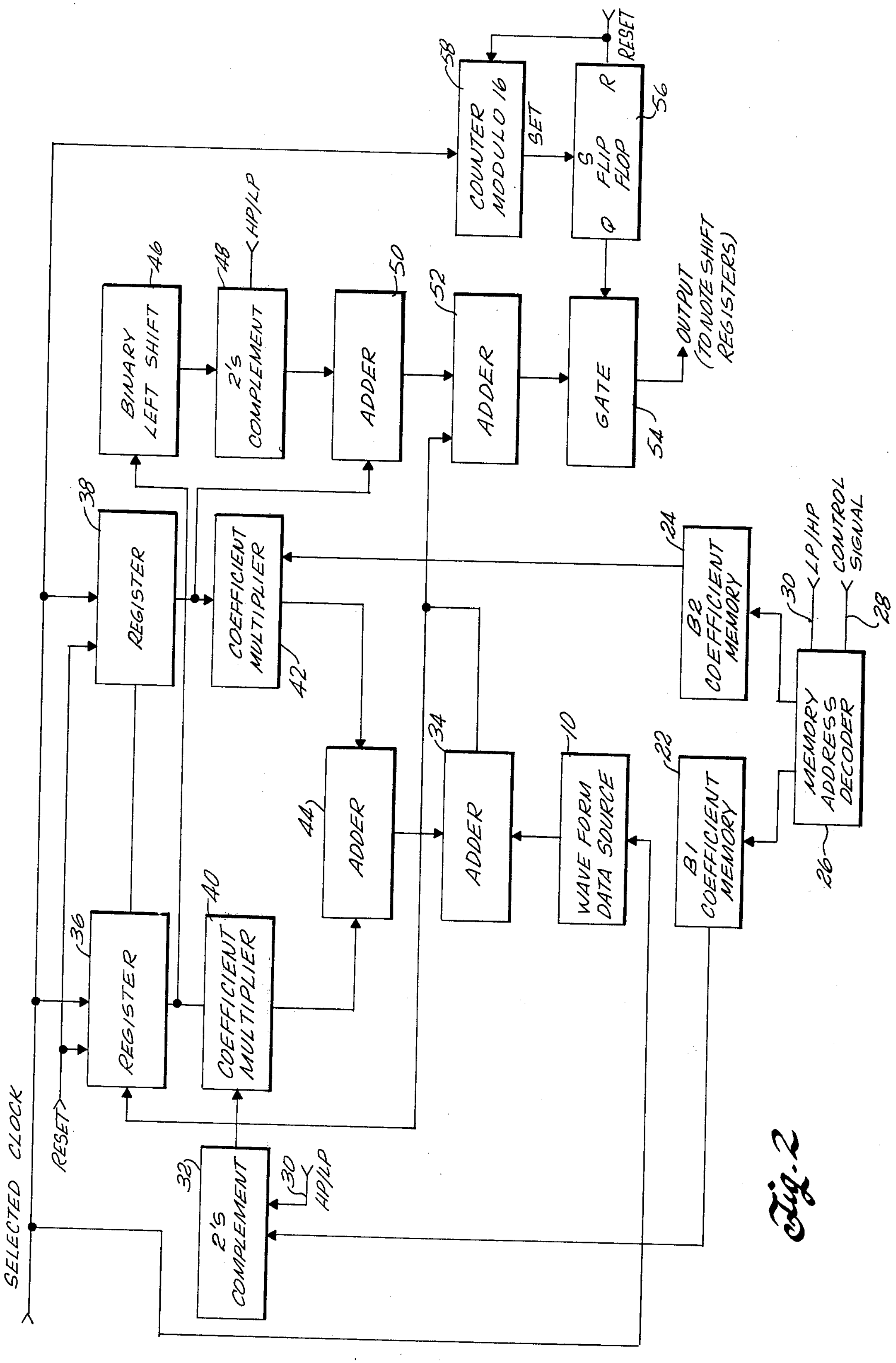
FIG. 2 is a schematic block diagram of a digital filter according to the present invention.

Referring to FIG. 2 in detail there is shown a block diagram of the preferred embodiment of a digital filter according to the present invention. The coefficient values $B_1$ of Tables 1 and 2 are stored in a coefficient memory 22, while the coefficients of $B_2$ of Tables 1 and 2 are stored in a coefficient memory 24. The coefficient memories are preferably Read Only memories with each coefficient being separately addressable by addresses from a memory address decoder 26 which generates addresses in response to a control signal received on input line 28. A binary signal on an input line 30 determines which coefficient is read out of the memories depending upon whether the filter is operating as a high pass or a low pass filter. By changing the control signal, the coefficients addressed in the two memories are changed. Thus by changing the control signal with time, the coefficients read out of the memories are changed with time, thereby changing the waveform of the tone being generated by changing the cut-off harmonic of the filter. Thus a sliding formant filter effect is produced by changing the control signal with time. By changing the binary input 30, the order of addresses (up or down) is reversed, thereby changing the direction of cut-off shift respectively for a low pass or for a high pass filter effect.

The coefficients read out of the memory 22 are applied to a 2's complement circuit 32 which in effect changes the sign of the coefficient or does not change the sign, depending upon whether the filter is being operated as a high pass or low pass filter. Waveform data from the source 10 is applied to one input of an adder 34. The output of the adder 34 is in turn applied to the input of a shift register 36 which is shifted at the sampling frequency by clock pulses from the selected note clock, as described above in connection with FIG. 1. The register 36 stores one data point and thus operates as a 1 clock delay. The output of the register 36 is shifted to a second register 38 which provides a second 1 clock delay.

The word in the shift register 36 is applied to one input of a coefficient multiplier 40 together with the coefficient from the memory 22 whose sign has been set by the 2's complement circuit 32. The word in the shift register 38 is applied to one input of a second coefficient multiplier 42 together with the coefficient from the memory 24. The products generated by the multipliers 40 and 42 are added by an adder 44 and applied to a second input to the adder 34 to be added to the current word from the waveform data source 10.

The output of the first register 36 is in effect multiplied by the coefficient $A_1=2$ by doing a binary left shift, as indicated at 46. The sign is then set by a 2's complement circuit 48, the sign being determined by whether the digital filter is operating as a high pass or a low pass filter. The output of the 2's complement circuit is applied as one input to an adder 50. The other input to the adder is derived from the second register 38. Since this value would normally be multiplied by the coefficient $A_2=1$, it is applied directly to the other input of the adder 50. The resultant outputs from the adders 34 and 50 are added by yet another adder 52 and gated to appropriate one of the Note Shift Registers by a gate 54 controlled by flip-flop 56 and a modulo-16 counter 58. The purpose of the counter and control flip-flop is to eliminate any starting transient of the digital filter. Digital filers, just as conventional analog filters, exhibit an initial transient at the start of an input signal. It has been found that for a digital filter having the coefficients given in Tables 1 and 2, the transient decays in about 8 to 10 clock times. The counter 58 actually counts up to 16 clock times before setting the flip-flop 56 and opening the gate 54. The flip-flop 56 is reset by a reset signal at the start of a transfer cycle.

Because digital filters exhibit unstable operation near their critical frequencies, the greater the numerical accuracy the closer the approach to the critical frequency can be. However, it is also desirable to use as few bits as possible in implementation of the filter to reduce the cost of the filter. It has been found that a good compromise design is to use coefficients with 8 binary bits and to limit the control signal so that the low pass filter cut-off does not go below the third harmonic and the high pass cut-off does not go above the twenty-eighth harmonic.

The coefficients $B_1$ and $B_2$ stored in the coefficient memories are modified by a gain term shown in the last column of Tables 1 and 2. The gain term is the insertion loss factor for the digital filter and is a function of the cut-off frequencies. The value stored in the coefficient memories are the product of the gain term and the coefficient values shown in Tables 1 and 2. Instead of storing the coefficients in a Read Only memory, a simple computer can be implemented to compute $B_1$, $B_2$ and GAIN as a function of the control signal. It has been found that an adequate approximation is $B_1=b_0+b_1S$, where $b_0=-2.180139$ and $b_1=0.1308903$ and S is the value of the control signal expressed as a number in the range $1<S<31$; $B_2=c_o+c_1S+c_2S^2$, where $c_0=0.9965652$, $C_1=-0.074192$, and $c_2=0.00244513$; and $GAIN=d_0+d_1S+d_2S^2$, where $d_0=-0.01346086$, $d_1=0.006864683$, and $d_2=0.0005903841$. For stability reasons, as discussed above, the value of S should be limited to the range of a minimum of 3 for a low pass filter and maximum of 28 for a high pass filter.

Figure 3:
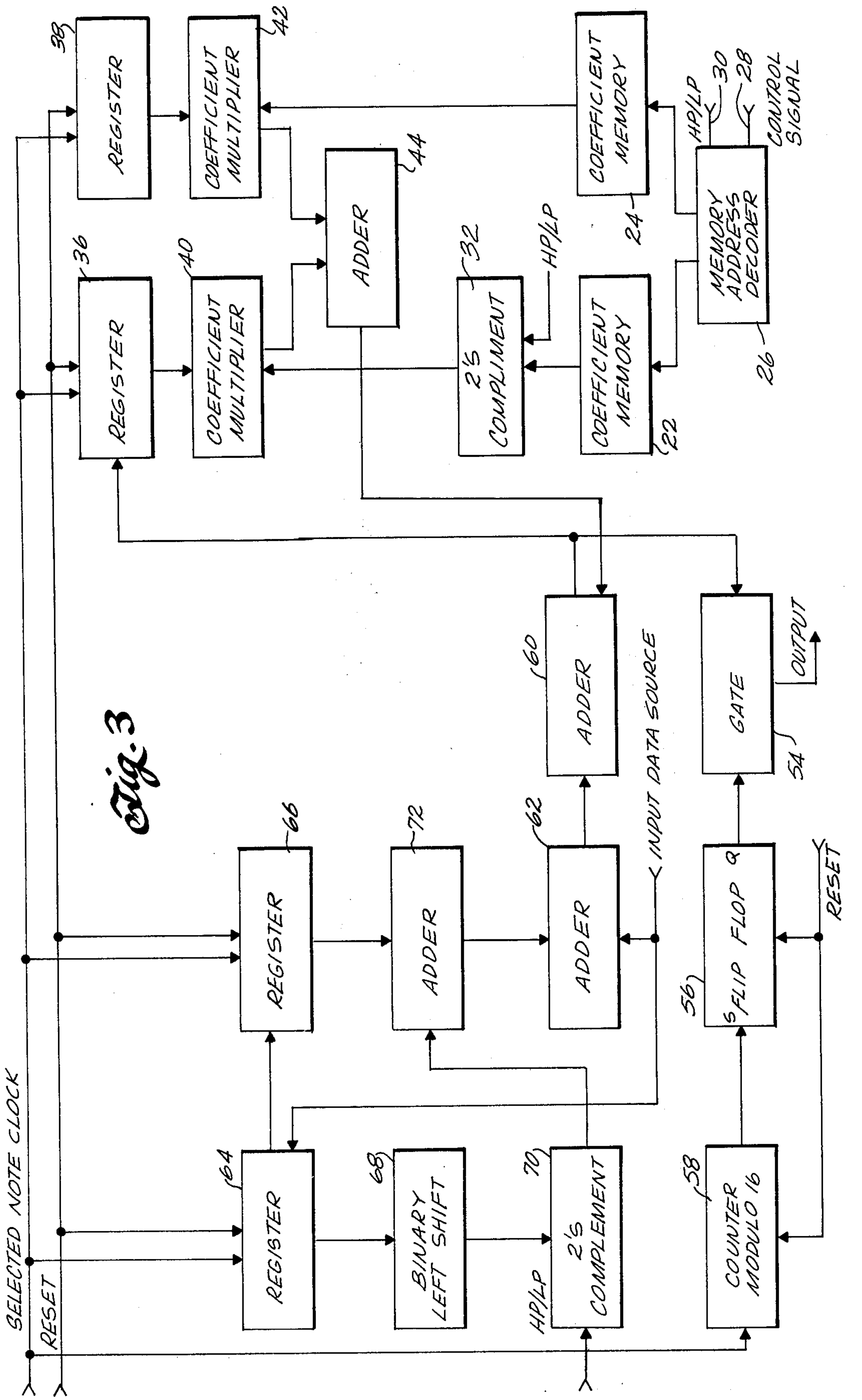
FIG. 3 is a schematic block diagram of an alternative circuit for a digital filter.

FIG. 3 shows an alternative arrangement for the digital filter 20 of FIG. 1 from that described above in connection with FIG. 2. As in FIG. 2, the $B_1$ and $B_2$ coefficients are stored in the coefficient memories 22 and 24 and are used to multiply the contents of the registers 36 and 38 and coefficient multipliers 40 and 42, respectively. The sum is provided by an adder 44. However, the input to the registers 36 and 38 is derived from an adder 60 which also provides the output through the gate 54. The output of the adder 60 is derived from the sum of the output of the adder 54 and the output of an adder 62 which receives the input data from the waveform data source 10. The input data is also applied to a one clock delay register 64, the output of which is shifted to a second one clock delay register 66. The content of the register 64 is multiplied by 2 by doing a binary left shift, as indicated at 68, and the sign is set by a 2's complement circuit 70 in response to the high pass/low pass input signal. An adder 73 adds the resultant to the contents of the register 66, the sum being applied as a second input to the adder 62. The implementation shown in FIG. 2 corresponds to a canonic form of digital filter, while the circuit arrangement of FIG. 3 corresponds to a direct form of digital filter.

Figure 8:
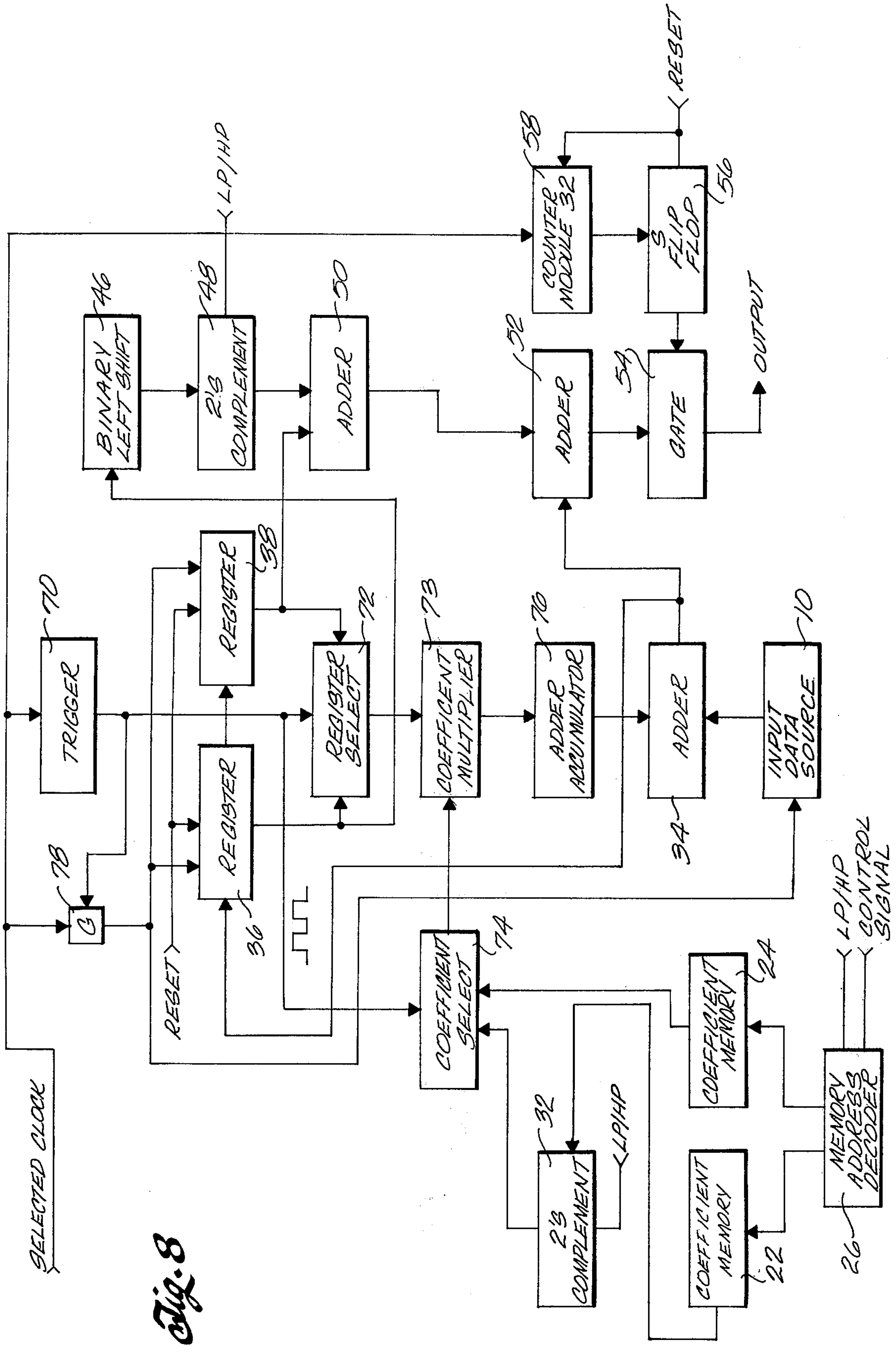
FIG. 8 is a schematic block diagram of yet another embodiment of a digital filter.

A preferred embodiment of the digital filter 20 is shown in FIG. 8 which is similar to the digital filter circuit of FIG. 2 but utilizes a single coefficient multiplier which is time-shared. The circuit of FIG. 8 utilizes a sampling clock frequency which is double the frequency of the clock in the circuit arrangement of FIGS. 2 and 3. The double frequency clock is applied to a trigger circuit 70 which controls a register select gate 72. The register select gate 72 alternately connects the two delay registers 36 and 38 to one input of the coefficient multiplier. Similarly a coefficient select gate 74 controlled by the trigger circuit 70 alternately connects the output of the two coefficient memories 22 and 24 to the other input of the coefficient multiplier. The output of the coefficient multiplier is applied to one input of an adder accumulator 76 which accumulates the sum of the two multiplications. The accumulated sum then is applied as one input to the adder 34 to be added to the word from the input data source 10 in the same manner described above in connection with FIG. 2. The circuit of FIG. 8 is otherwise identical to that of the digital filter circuit of FIG. 2. It should be noted that the circuit 70 controls a gate 78 for gating every other clock pulse to the registers 36 and 38 and to the input data source 10 for shifting these registers with every other clock pulse from the selected clock source.

Figure 9:
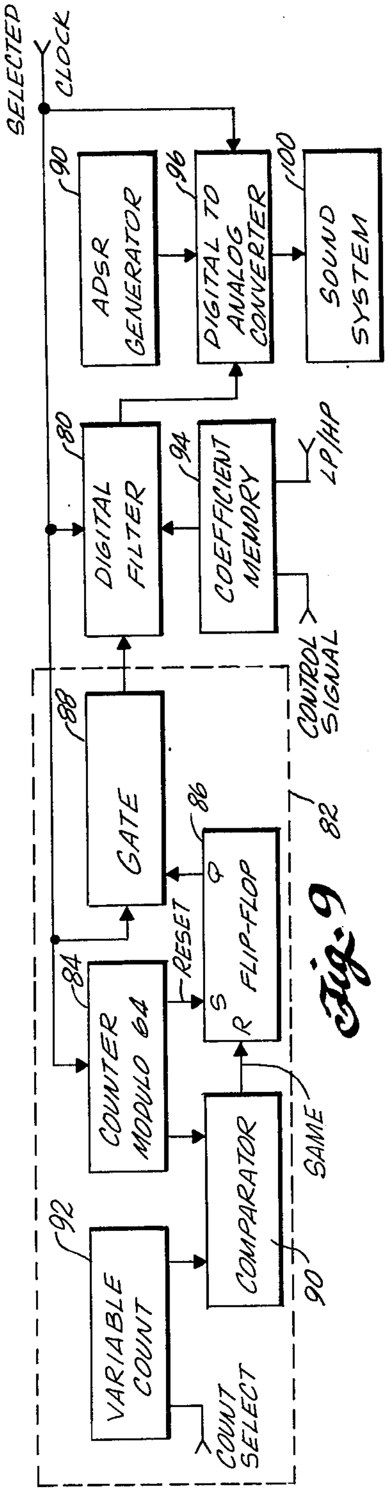
FIGS. 9–11 are block diagrams of other embodiments of the invention.

Referring to FIG. 9 there is shown a monophonic synthesizer using a digital filter. The input to a digital filter 80 is derived from a digital rectangular wave generator indicated generally at 82. A selected clock having a pulse rate which is 64 times the pitch of the tone being generated is applied to a modulo 64 counter 84. Whenever the counter 84 counts from 63 back to zero, it generates an overflow pulse which sets a control flip-flop 86. The control flip-flop in turn opens a gate 67 which passes clock pulses to the digital filter 80.

The control flip-flop 86 is reset by the output of a comparator 90 which compares the count condition of the counter 84 with a digital value stored in a variable count register 92. The register 92 can be set to any value between 0 and 63 by a count select input. The count select input may be controlled, for example, manually by the operator of the instrument to preset a desired count condition in the variable count register 92 by which the operator is able to control the tonal effect of the synthesizer.

The digital filter 80 is controlled from a coefficient memory 94 in the manner described above in connection with FIGS. 2, 3, and 8. The output from the digital filter is applied to a digital-to-analog converter 96 which is modulated by the output of an ADSR generator 98 to provide an audio frequency analog signal to the sound system 100.

In operation, it will be seen that the gate 88 is turned on periodically at intervals corresponding to 64 clock pulses. The gate remains on for a number of pulses determined by the setting of the variable count register 92. For example, if the variable count register 92 is set to a count of 32, the gate remains open for 32 clock pulses and closed for 32 clock pulses. This corresponds to a square wave condition. The output of the gate 88 applies either of two digital conditions to the input of the digital filter 80, namely 0 or 1, depending upon whether the gate 88 is closed or gates a clock pulse to the digital filter. Thus the input to the digital filter is a sequence of digital values corresponding to sample points of a rectangular wave having a repetition frequency determined by the selected clock which in turn is controlled in frequency by the particular key operated on the keyboard of the instrument.

Figure 10:
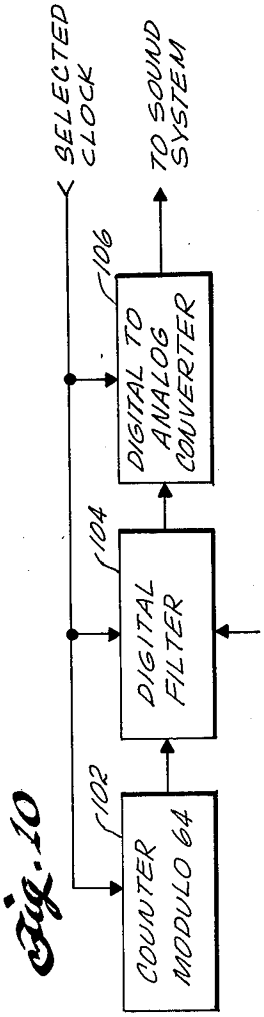

Instead of generating digital data corresponding to sample points on a rectangular wave, the sample points may correspond to a triangular wave. Such a circuit arrangement is shown in FIG. 10. In this case a counter 102 is coupled directly to the input of the digital filter 104 and the modified digital information is applied to a digital-to-analog converter 106. The counter 102 is synchronized with the selected clock. Thus the digital sample points applied to the digital filter increase linearly with the counting up of the counter 102. The sample points corresponding to a triangular wave are generated as the counter counts up to its maximum value and resets back to zero during successive counting cycles.

Figure 11:
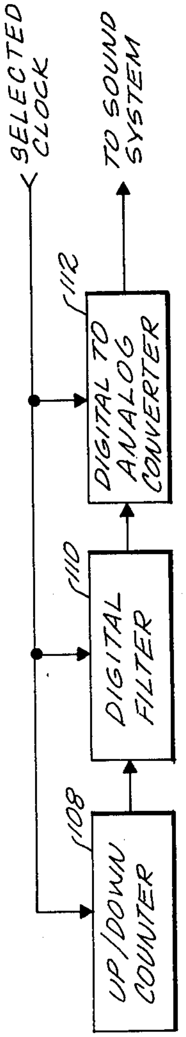

A closer approximation to a sinusoid input can be provided by using sample points corresponding to a triangular wave, rather than a rectangular wave or a sawtooth wave. Such an arrangement is shown in FIG. 11 in which an up/down counter 108 provides the digital input to a digital filter 110. Rather than counting up to the maximum count and resulting to zero, as does the counter 102 of FIG. 10, the up/down counter 108 alternately counts up and counts down in response to a succession of input clock pulses from the selected clock source. Thus the input data to the digital filter corresponds to sample points forming a triangular waveform. The digital data is modified by the digital filter 110 in the manner described above in connection with FIGS. 2, 3, and 8 and is then applied to a digital-to-analog converter 112 to convert the data to an audio signal for driving a suitable sound system 100.

What is claimed is:

1. A digital tone generator comprising:

a source of a set of digital word coded to represent the relative amplitudes of a series of equally spaced points defining the complex periodic waveshape of an audio tone, the number of words defining one cycle of a tone being a predetermined fixed number independent of the frequency of the tone, digital filter means receiving each of the words from said source in predetermined time sequence for digitally filtering the waveshape, the digital filter means modifying in a predetermined manner the coded value of the words to change the relative amplitudes of the successive points defining the periodic waveshape, a digital-to-analog converter, means transferring successive words from said source through the digital filter to the converter at a variable rate, said transferring means including transient suppressing means for blocking transfer of a predetermined number of the initial data points from the output of the digital filter means to the converter, and means setting said rate equal to the desired pitch frequency multiplied by the number of words defining one cycle of the tone being generated.

2. The apparatus of claim 1 wherein the digital filter modifies the coded words to correspond to the amplitudes of points on said periodic waveshape having all harmonics below a preselected number attenuated.

3. The apparatus of claim 1 wherein the digital filter modifies the coded words to correspond to the amplitudes of points on said periodic waveshape having all harmonics above a preselected number attenuated.

4. The apparatus of claim 3 wherein the digital filter includes means responsive to a variable input control signal for controlling the amplitude of points on said periodic waveshape such that the harmonic of the resulting periodic waveshape at which the digital filter cuts off is changed.

5. Apparatus of claim 4 wherein said means for controlling the amplitudes includes means generating a plurality of coefficient values, and means for changing said values to change the cutoff harmonics of the digital filter.

6. Apparatus of claim 5 wherein said means generating a plurality of coefficient values includes addressable storing means storing a table of coefficient values arranged in sets, the digital filter means including means responsive to a set of coefficient values from the table for controlling the harmonic of the tone being generated by data from said source at which the digital filter cuts off.

7. A digital tone synthesizer with sliding formant filter comprising a source of digitized data representing the relative amplitudes of a series of equally spaced points defining at least one cycle of a non-sinusoidal audio waveform, the number of points defining one cycle being fixed, a plurality of tone generators for generating a plurality of notes of different pitch, each tone generator including a note register for storing digitized data received from said source, a digital-to-analog converter, and a source of clock signals having pulse rates proportional to the pitch of the tone generators, means responsive to the output of said converters for generating an audible sound, digital filter means connected to said source for digitally filtering the waveform data from said source, means selectively switching the output of the digital filter means to any one of said tone generators, means responsive to the switching means for synchronizing the sampling rate of the source and digital filter means with the source of clock signals of the selected tone generator to transfer the waveform data from the source through the digital filter means to the note register of the selected tone generator at a rate proportional to the pitch of the selected tone generator, said means for digitally filtering the waveform data including means responsive to a variable input control signal for changing the cut-off characteristic of the digital filter means.

8. Apparatus of claim 7 further including transient suppressing means connected to the output of the digital filter means for initially blocking transfer of a predetermined number of data points to a tone generator from the digital filter means.

9. The synthesizer of claim 7 wherein the means for digitally filtering the waveform data from said source includes first and second addressable memory means storing a group of coefficient values, first and second delay means connected in series, first adder means having one input connected to said source for receiving the data as it is transferred from the source at said selected rate, the output of the first adder means being applied to the first delay means, a first multiplier connected to the output of the first addressable memory means and the output of the first delay means, a second multiplier connected to the output of the second addressable memory and the output of the second delay means, second adder means having one input connected to the output of the first multiplier and the second input connected to the output of the second multiplier, the output of the second adder means being connected to an input of said first adder means, binary left shift means connected to the output of the first delay means, and third adder means connected to the output of the second delay means, the binary left shift means and the first adder means to form the output of the means for digitally filtering the waveform data.

10. Apparatus of claim 9 further including means responsive to changes in the input cut-off frequency control signal for addressing different selected ones of the coefficients stored in the first and second memories to change the cut-off characteristics of the means for digitally filtering the waveform data.

11. Apparatus of claim 10 further including means responsive to a binary input signal indicative of high pass or low pass filter operation for reversing the addressing order of the coefficients in said addressable memories in response to the control signal.

12. Apparatus of claim 11 further including means responsive to said binary input signal for selectively generating or not generating the 2's complement of the coefficient value read out of the first coefficient memory and the output of the binary left shift means.

13. The synthesizer of claim 7 wherein the means for digitally filtering the waveform data from said source includes first and second addressable memory means storing a group of coefficient values, first and second delay means connected in series, first adder means having one input connected to said source for receiving the data as it is transferred from the source at said selected rate, the output of the first adder means being applied to the first delay means, a first multiplier connected to the output of the first addressable memory means and the output of the first delay means, a second multiplier connected to the output of the second addressable memory and the output of the second delay means, second adder means having one input connected to the output of the first multiplier and the second input connected to the output of the second multiplier, the output of the second adder means being connected to an input of said first adder means, third and fourth delay means connected in series, said source being connected to the input of the third delay means, binary left shift means connected to the output of the third delay means, and adder means connected to the output of the fourth delay means and the binary left shift means, the output of the third adder means and the second adder means being connected to said first adder means to form the output of the means for digitally filtering the waveform data.

14. Apparatus of claim 13 further including means responsive to changes in the input cut-off frequency control signal for addressing different selected ones of the coefficients stored in the first and second memories to change the cut-off characteristics of the means for digitally filtering the waveform data.

15. Apparatus of claim 14 further including means responsive to a binary input signal indicative of high pass or low pass filter operation for reversing the addressing order of the coefficients in said addressable memories in response to the control signal.

16. Apparatus of claim 15 further including means responsive to said binary input signal for selectively generating or not generating the 2's complement of the coefficient value read out of the first coefficient memory and the output of the binary left shift means.

* * * * *

UNITED STATES PATENT AND TRADEMARK OFFICE

CERTIFICATE OF CORRECTION

PATENT NO. : 4,267,761

DATED : May 19, 1981

INVENTOR(S) : Ralph (nmi) Deutsch

It is certified that error appears in the above-identified patent and that said Letters Patent are hereby corrected as shown below:

Column 4, line 35, after "filter" insert -- designed --.

Column 5, Table 1, 7th line of column $B_2$, "6.8700E-001" should read -- 6.87500E-001 --.

Column 5, Table 2, 23rd line of column $B_2$, "5.13933E-:0" should read -- 5.13933E-001 --.

Column 5, Table 2, 24th line of column $B_2$, delete "001".

Column 6, Table 2, 25th line of column $A_2$, "1.0000E+000" should read -- 1.00000E+000 --.

Column 7, line 44, delete "filers" and substitute therefor -- filters --.

Signed and Sealed this

*Fifteenth* Day of *September 1981*

[SEAL]

*Attest:*

GERALD J. MOSSINGHOFF

*Attesting Officer* *Commissioner of Patents and Trademarks*